United States Patent
Kim et al.

(10) Patent No.: US 10,221,942 B2
(45) Date of Patent: Mar. 5, 2019

(54) SHIFT CONTROL DEVICE FOR VEHICLE

(71) Applicant: TOYOTA JIDOSHA KABUSHIKI KAISHA, Toyota-shi, Aichi-ken (JP)

(72) Inventors: Jonggap Kim, Hadano (JP); Yoshio Ito, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 101 days.

(21) Appl. No.: 14/889,557

(22) PCT Filed: May 7, 2013

(86) PCT No.: PCT/JP2013/062819
§ 371 (c)(1),
(2) Date: Nov. 6, 2015

(87) PCT Pub. No.: WO2014/181387
PCT Pub. Date: Nov. 13, 2014

(65) Prior Publication Data
US 2016/0084376 A1    Mar. 24, 2016

(51) Int. Cl.
*F16H 61/02* (2006.01)
*F16H 61/04* (2006.01)

(52) U.S. Cl.
CPC ......... *F16H 61/04* (2013.01); *F16H 61/0213* (2013.01); *B60Y 2300/18083* (2013.01);
(Continued)

(58) Field of Classification Search
CPC .............. F16H 61/0213; F16H 61/04; F16H 2061/0218; F16H 2061/0234;
(Continued)

(56) References Cited

U.S. PATENT DOCUMENTS 5,961,418 A   10/1999 Taniguchi et al.
8,394,001 B2  3/2013 Tsutsui et al.
(Continued)

FOREIGN PATENT DOCUMENTS

CN   102725563 A   10/2012
EP   2865914 A1    4/2015
(Continued)

OTHER PUBLICATIONS

Office Action dated Apr. 8, 2016 in U.S. Appl. No. 14/414,593.
Notice of Allowance dated Nov. 10, 2016, in U.S. Appl. No. 14/414,593.

*Primary Examiner* — Edwin A Young
(74) *Attorney, Agent, or Firm* — Hunton Andrews Kurth LLP

(57) ABSTRACT

Provided is a shift control device for a vehicle in which an automatic transmission in which a gear stage is set based on data showing traveling states including at least a driving demand is mounted, the shift control device for a vehicle setting a neutral state where power is not transmitted by releasing an engagement mechanism engaged such that a predetermined gear stage is set in the automatic transmission when the driving demand becomes equal to or less than a predetermined value determined in advance during traveling, in which the shift control device for a vehicle is configured such that a virtual gear stage as an input rotation speed close to an input rotation speed of the automatic transmission in the neutral state is obtained based on a vehicle speed at a time point when the virtual gear stage is obtained and a gear ratio at a gear stage allowed to be set in the automatic transmission when a target gear stage based on the driving demand is set with the neutral state eliminated by the driving demand exceeding the predetermined value during the traveling in the neutral state, and the shift control device for a vehicle is configured such that control of a second shift toward the target gear stage is initiated during a first shift between a current gear stage to be set based on the data showing the traveling states during the elimination of the neutral state and the virtual gear stage.

8 Claims, 9 Drawing Sheets

(52) U.S. Cl.
CPC ............... *F16H 2061/0218* (2013.01); *F16H 2061/0234* (2013.01); *F16H 2061/0481* (2013.01); *F16H 2061/0488* (2013.01)

(58) Field of Classification Search
CPC ..... F16H 2061/0481; F16H 2061/0488; B60Y 2300/18083
See application file for complete search history.

(56) References Cited

U.S. PATENT DOCUMENTS

| | | |
|---|---|---|
| 2007/0102208 A1 | 5/2007 | Okuda et al. |
| 2007/0287586 A1 | 12/2007 | Steinhauser et al. |
| 2007/0287590 A1 | 12/2007 | Steinhauser et al. |
| 2011/0239800 A1 | 10/2011 | Sekii et al. |
| 2011/0245005 A1 | 10/2011 | Tsutsui et al. |
| 2012/0010047 A1 | 1/2012 | Strengert et al. |
| 2015/0006045 A1 | 1/2015 | Motozono et al. |
| 2015/0149058 A1 | 5/2015 | Kim et al. |
| 2015/0166065 A1 | 6/2015 | Kuroki et al. |
| 2015/0191172 A1 | 7/2015 | Kim |
| 2015/0274168 A1 | 10/2015 | Kuroki et al. |
| 2015/0291171 A1 | 10/2015 | Kuroki et al. |
| 2015/0307103 A1 | 10/2015 | Kuroki et al. |

FOREIGN PATENT DOCUMENTS

| | | |
|---|---|---|
| JP | 10-181388 A | 7/1998 |
| JP | 11-108178 A | 4/1999 |
| JP | 2005-226701 A | 8/2005 |
| JP | 2011-214673 A | 10/2011 |
| JP | 2014-074449 A | 4/2014 |

|     | C1 | C2 | B1 | B2 | B3 | F1 |
|-----|----|----|----|----|----|----|
| P   | ×  | ×  | ×  | ×  | ×  | ×  |
| R   | ×  | ×  | ×  | ○  | ○  | ×  |
| N   | ×  | ×  | ×  | ×  | ×  | ×  |
| 1st | ○  | ×  | ×  | ×  | ×  | ○  |
| 2nd | ○  | ×  | ○  | ×  | ×  | ×  |
| 3rd | ○  | ×  | ×  | ×  | ○  | ×  |
| 4th | ○  | ○  | ×  | ×  | ×  | ×  |
| 5th | ×  | ○  | ×  | ×  | ○  | ×  |
| 6th | ×  | ○  | ○  | ×  | ×  | ×  |

SHIFT CONTROL DEVICE FOR VEHICLE

CROSS-REFERENCE TO RELATED APPLICATION

This is a national phase application based on the PCT International Patent Application No. PCT/JP2013/062819 filed May 7, 2013, the entire contents of which are incorporated herein by reference.

TECHNICAL FIELD

The invention relates to a device that controls a gear stage of a vehicle and, more particularly, to a device that performs control pertaining to a case where a transmission sets a predetermined gear stage from a neutral state where no gear stage is set during traveling.

BACKGROUND ART

An automatic transmission that is mounted in a vehicle is set to a predetermined gear stage depending on traveling states determined based on a vehicle speed, an accelerator opening degree, or the like. This gear stage is set to allow a driving force source such as an engine to be operated in a state where energy efficiency is as high as possible and to satisfy a driving request represented by the accelerator opening degree or the like. Accordingly, in a case where an accelerator pedal is allowed to return for deceleration, for example, the engine is forced to be driven by the traveling inertial force of the vehicle and the power loss that is generated in the driving force source in that case is allowed to act as a braking force so that a driver can perform the deceleration as intended. However, the deceleration may not be the purpose of the operation for the return of the accelerator pedal in some cases and the return of the accelerator pedal may be performed so as to maintain the vehicle speed, instead of decelerating the vehicle, in some cases. In such cases, the power loss that is generated in a power source may cause fuel economy to be deteriorated.

In order to eliminate the factor that causes the deterioration in fuel economy, control for putting the transmission into the neutral state during so-called coasting, when an accelerating operation or a driving force-increasing operation is not performed, is performed. This neutral control is, in short, control for blocking power transmission between the power source such as the engine and a drive wheel. In the vehicle in which the automatic transmission is mounted, the neutral state is set by an engagement mechanism such as a clutch and a brake for gear stage setting being in a released state in some cases. When the accelerator pedal is depressed in the so-called coasting state based on the setting of the neutral state, for example, the released engagement mechanism is engaged for a return from the neutral state and the gear stage determined based on the accelerator opening degree, the vehicle speed, or the like is set.

This gear stage is to generate a required driving force, and thus it is preferable that the shift thereof is achieved quickly. A device that is used to meet the demand is disclosed in Japanese Patent Application Publication No. 2011-214673 (JP 2011-214673 A). In this device, a shift stage that is on a higher-speed side than a final shift stage (shift stage with a lower gear ratio) determined based on the vehicle speed, a driving demand, or the like is determined as an intermediate target shift stage in the case of a transition from a free-running state where the transmission is set to the neutral state to a so-called actual traveling state where a shift stage is formed. Then, shift to the final shift stage is executed after the intermediate target shift stage is temporarily set and the intermediate target shift stage is achieved.

According to the shift device that is disclosed in JP 2011-214673 A, the time taken for shift increases because an input rotation speed is significantly increased during the shift from the neutral state toward the final target shift stage while the amount of change in the input rotation speed pertaining to the case of the shift toward the intermediate target shift stage decreases because the intermediate target shift stage has a gear ratio lower than that of the final target shift stage. Accordingly, the control described above allows the overall shift time to be shortened and acceleration response to be improved. Accordingly, in the device that is disclosed in JP 2011-214673 A, the intermediate target shift stage is set first and then the driving force is generated in accordance with the gear ratio of the intermediate target shift stage in the case of a return from the neutral state to a state where a predetermined shift stage is set based on the generation of an acceleration request. Then, shift control toward the final target shift stage is initiated after the completion of the setting of the intermediate target shift stage. As described above, the shift toward the final target shift stage is initiated after the completion of the setting of the intermediate target shift stage. As a result, the time required for the setting of the final target shift stage conforming to the driver's driving request corresponds to the sum of the time taken from the neutral state to the setting of the intermediate target shift stage and the time taken from the intermediate target shift stage to the completion of the shift toward the final target shift stage. Accordingly, much time is taken until the setting of the shift stage where an intended driving force is generated after the accelerating operation such as the depression of the accelerator pedal is performed, and thus there is room for improvement regarding the improvement of the acceleration response.

SUMMARY OF THE INVENTION

The invention has been made in view of the technical problems described above, and an object thereof is to improve shift response during a transition from a neutral coasting state to a traveling state where a gear stage meeting a driving request is set.

In order to achieve the above-described object, a shift control device is provided for a vehicle, in which an automatic transmission is mounted. In the automatic transmission, a gear stage is set based on data showing traveling states, including at least a driving demand. The shift control device is configured to set a neutral state, where power is not transmitted, by releasing an engagement mechanism engaged such that a predetermined gear stage is set in the automatic transmission, when a predetermined condition is satisfied during traveling, such that coasting is allowed. The shift control device is configured such that a virtual gear stage as an input rotation speed close to an input rotation speed of the automatic transmission in the neutral state is obtained based on a vehicle speed at a time point when the virtual gear stage is obtained and a gear ratio at a gear stage allowed to be set in the automatic transmission when a target gear stage based on the driving demand is set with the neutral state eliminated by the predetermined condition not being satisfied during the coasting in the neutral state. The shift control device is configured such that control of a second shift toward the target gear stage is initiated during a first shift between a current gear stage to be set based on the data showing the traveling states during the elimination of the neutral state and the virtual gear stage.

According to the invention, the electronic control unit is configured to calculate the virtual gear stage such that the virtual gear stage is a gear stage at which a product of a gear ratio and an output rotation speed of the automatic transmission is closest to the input rotation speed in the neutral state at a time point when the virtual gear stage is calculated, and at which the product is less than the input rotation speed.

In addition, the electronic control unit is further configured to perform a pre-shift gear stage in a case where the virtual gear stage is a gear stage corresponding to the current gear stage or a gear stage on a higher-speed side than the current gear stage.

In addition, the pre-shift gear stage may be a gear stage on a lower-speed side than the virtual gear stage by a margin of one stage.

Accordingly, with the invention, the control for the return from N coasting can be executed as the shift control based on the setting of the virtual gear stage and the multiple shift allowing the shift control and the shift control toward the target gear stage to proceed at the same time can be performed. When the multiple shift is performed during the return from the coasting in the neutral state, the shift toward the target gear stage can be initiated early, and thus the target gear stage can be achieved early and shift response can be improved.

Since the virtual gear stage is obtained based on the input rotation speed of the automatic transmission and the current gear stage is obtained based on the output rotation speed and the gear ratio, the virtual gear stage and the current gear stage may correspond to each other. In this case, however, the invention adopts the other gear stage as the gear stage on the lower-speed side than the virtual gear stage by a margin of one stage as the pre-shift gear stage instead of having the pre-shift gear stage of the first shift as the virtual gear stage. As a result, the control for the return from the coasting in the neutral state can be executed as the shift control.

MODES FOR CARRYING OUT THE INVENTION

The invention relates to a shift control device for an automatic transmission that is mounted in a vehicle which is controlled to coast in a neutral state when a predetermined condition is satisfied during the traveling of the vehicle at a vehicle speed equal to or higher than a predetermined vehicle speed. The automatic transmission is a stepped automatic transmission that has a plurality of engagement mechanisms such as a clutch and a brake, in which a plurality of gear stages are set when the engagement mechanisms are appropriately engaged or released. Accordingly, the neutral state is set when any one or two of the engagement mechanisms, which are engaged for the setting of a predetermined gear stage, are released.

The coasting (hereinafter, referred to as N coasting), which is based on the neutral-state setting of the automatic transmission, refers to a state where neither a driving force nor an engine brake force is required. Accordingly, examples of the above-described predetermined condition for the execution of the N coasting (execution condition) include a vehicle speed being equal to or higher than a vehicle speed determined in advance, an accelerator opening degree being equal to or less than a predetermined value close to "0" with an accelerator pedal allowed to return, a brake pedal not being depressed, a rate of decrease in accelerator opening degree and a rate of decrease in accelerator pedal tread force exceeding a predetermined value, the vehicle-to-vehicle distance from a preceding vehicle being at least a predetermined distance determined in advance, and a steering angle being equal to or less than a predetermined angle determined based on design considerations. In a hybrid car in which a motor also serves as a driving force source, the above-described condition may also include the lack of necessity of charging based on a charging capacity (SOC) of an electric power storage device that is equal to or greater than a predetermined amount.

Figures 9, 10:
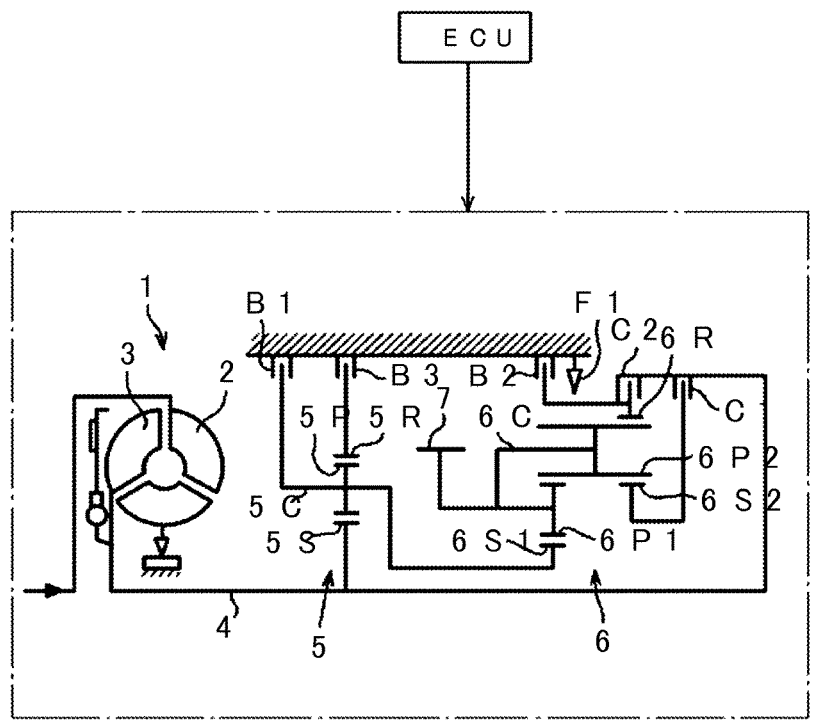
FIG. 9 is a skeleton diagram illustrating a gear train of an automatic transmission that can be an object of the invention.
FIG. 10 is a chart collectively illustrating the engagement and release states of each engagement mechanism for the setting of each gear stage.

An example of the automatic transmission that can be an object of the invention is illustrated in the skeleton diagram of FIG. 9. This example is a transmission that is capable of setting six forward and one reverse gear stages. A gear train that is configured to have two sets of planetary gear mechanisms as main components is arranged to be continuous with a torque converter 1 provided with a lockup clutch. In the torque converter 1, which is similar in configuration to those that are known, a pump impeller 2 is connected to an engine (not illustrated) and a turbine runner 3 is connected to an input shaft 4.

A single pinion-type planetary gear mechanism 5 and a Ravigneaux-type planetary gear mechanism 6 correspond to the two sets of planetary gear mechanisms that constitute the gear train. The single pinion-type planetary gear mechanism 5 is provided with a sun gear 5S, a ring gear 5R that is arranged concentrically with the sun gear 5S, and a carrier 5C that rotatably and pivotally holds a pinion gear 5P which meshes with the sun gear 5S and the ring gear 5R. The sun gear 5S is connected to the input shaft 4. In addition, a first brake B1 is disposed so as to stop the rotation of the carrier 5C and a third brake B3 is disposed so as to stop the rotation of the ring gear 5R. The brakes B1, B3, which correspond to the engagement mechanisms according to the invention, are configured as wet multi-plate brakes or the like.

The Ravigneaux-type planetary gear mechanism 6, which is arranged coaxially with the single pinion-type planetary gear mechanism 5, is provided with a first sun gear 6S1 and a second sun gear 6S2. A ring gear 6R is arranged concentrically with the sun gears 6S1, 6S2. A first pinion gear 6P1 and a second pinion gear 6P2, which mesh with each other, are arranged between the first sun gear 6S1 and the ring gear 6R. The first pinion gear 6P1 also meshes with the first sun gear 6S1 and the second pinion gear 6P2 also meshes with a ring gear 6P. The second sun gear 6S2 meshes with the second pinion gear 6P2. The first and second pinion gears 6P1, 6P2 are rotatably and pivotally held by a carrier 6C. Accordingly, the first sun gear 6S1, the ring gear 6R, and the carrier 6C constitute a double pinion-type planetary gear mechanism and the second sun gear 6S2, the ring gear 6R, and the carrier 6C constitutes a single pinion-type planetary gear mechanism.

The first sun gear 6S1 is connected to the carrier 5C of the single pinion-type planetary gear mechanism 5. The rotation of the first sun gear 6S1 is stopped by the first brake B1. The carrier 6C is an output element and an output gear 7 is integrally disposed in the carrier 6C.

A first clutch C1 that connects the second sun gear 6S2 and the input shaft 4 to each other is arranged, between the second sun gear 6S2 and the input shaft 4, as the engagement mechanism for gear stage setting. A second clutch C2 that connects the ring gear 6R and the input shaft 4 to each other is disposed between the ring gear 6R and the input shaft 4. A second brake B2 is disposed so as to fix the ring gear 6R. A one-way clutch F1 is disposed in parallel with the second brake B2. The one-way clutch F1 is configured to be engaged and stop the rotation of the ring gear 6R in a case where torque for rotation in the direction opposite to the input shaft 4 acts on the ring gear 6R. The first clutch C1, the second clutch C2, and the second brake B2 can be configured as wet multi-plate clutches or a multi-plate brake as is the case with the first brake B1 and the third brake B3.

FIG. 10 collectively illustrates the engagement mechanisms that are engaged or released at each of parking (P) range, reverse (R) range, and neutral (N) range positions and first to sixth speeds. The "O" marks in FIG. 10 represent engagement and the "x" marks in FIG. 10 represent release. The thick frames in FIG. 10 represent the clutches that are released during the N coasting. During control for the setting of each position and gear stage in the automatic transmission illustrated in FIG. 9, which is similar to control in known automatic transmissions, each of the parking (P) range, reverse (R) range, and neutral (N) range positions is selected when a driver operates a shift device (not illustrated) and each gear stage for forward traveling is selected when a drive (D) range is selected. The gear stages from the first speed to the sixth speed illustrated in FIG. 10 are set based on traveling states of the vehicle. In other words, a shift control device ECU that controls the automatic transmission is configured to have a microcomputer as a main component, is provided with a shift diagram (shift map) in which a relationship between data showing the traveling states of the vehicle such as the vehicle speed and the accelerator opening degree and the gear stage which should be set is determined in advance, and is configured to determine the gear stage based on the data showing an input traveling state and the shift map. Among the input data, an output rotation speed No of the automatic transmission is adopted as the vehicle speed. More specifically, the rotation speed of the above-described output gear 7 is detected by a sensor (not illustrated) and the detection signal is input to the shift control device ECU. A gear ratio is the ratio between an input rotation speed and the output rotation speed No of the automatic transmission. The input rotation speed is, for example, a rotation speed Nt of the turbine runner 2 or the input shaft 4 as described above.

Shift control is executed by the shift control device ECU in the vehicle in which the automatic transmission is mounted. The shift control is to set a predetermined gear stage based on data showing a driving demand such as the accelerator opening degree during the traveling and the traveling states such as the vehicle speed. In addition, the neutral state is set when a predetermined condition is satisfied. This control is control that is referred to as N coasting control and is control that allows the coasting of the vehicle by blocking torque transmission between a driving force source such as the engine and a drive wheel. Examples of the execution condition for this control include the vehicle speed being equal to or higher than a vehicle speed determined in advance, the driving demand such as the accelerator opening degree being "0" or equal to or less than a predetermined value, and the lack of a brake operation. In the case of a hybrid car, the examples also include an electric power storage capacity (state of charge: SOC) being equal to or greater than a predetermined amount. In summary, the execution condition for the N coasting control is the lack of necessity of engine power output and the lack of necessity to cause power loss attributable to pumping loss or the like to act as a braking force.

The neutral state is, in short, a state where the torque transmission between the engine and the drive wheel is blocked. In the automatic transmission according to the invention, the neutral state is set by the release of the clutch performing the torque transmission in a predetermined gear stage. In this case, the engine is controlled to be in an idling state or a stationary state. In the following description, the released clutch will be referred to as a clutch for N coasting, which is illustrated within the thick frames in FIG. 10. Accordingly, the clutch for N coasting is released when the above-described execution condition regarding the N coasting control is satisfied and is engaged when the execution condition is not satisfied. The non-satisfaction of the above-described execution condition that occurs when, for example, the accelerator pedal is depressed during the N coasting and the subsequent engagement of the clutch for N coasting are referred to as return from N coasting and control related thereto is referred to as return control in some cases.

When the N coasting is performed, the vehicle speed changes due to wind pressure resistance, a road load, the friction loss of the vehicle itself, or the like. For example, the vehicle speed gradually decreases on a flat road or an uphill, the vehicle speed is maintained on a downhill having a slight declivity with an accelerating force attributable to gravity balanced with resistance, and the vehicle speed gradually increases on a downhill having a greater declivity. The output rotation speed No of the automatic transmission changes as a result of the change in the vehicle speed, and thus the gear stage (hereinafter, referred to as a current gear stage in some cases) is determined depending on the output rotation speed No, even when the driving demand such as the accelerator opening degree does not change, and the engagement mechanism such as the brake is engaged or released so that the gear stage is achieved. In this case, the clutch for N coasting is maintained in a released state. In a case where control for maintaining the engine at an idling rotation speed is executed during the N coasting, the rotation speed of the engine may change due to the driving of auxiliary machinery such as the driving of an air compressor (not illustrated) for air conditioning although a change in engine rotation speed attributable to the accelerator opening degree does not occur since the accelerator opening degree is equal to or less than a predetermined value.

In the case of the return from N coasting, the engagement mechanism that is correlated with the traveling state which changes during the N coasting as described above is engaged. When the return from N coasting is a return attributable to an accelerator pedal operation, for example, the control for the return from N coasting and the shift control attributable to the accelerator operation are executed. The shift control device ECU according to the invention is provided with a configuration that executes the two overlapping or successive control processes as described below.

Figure 1:
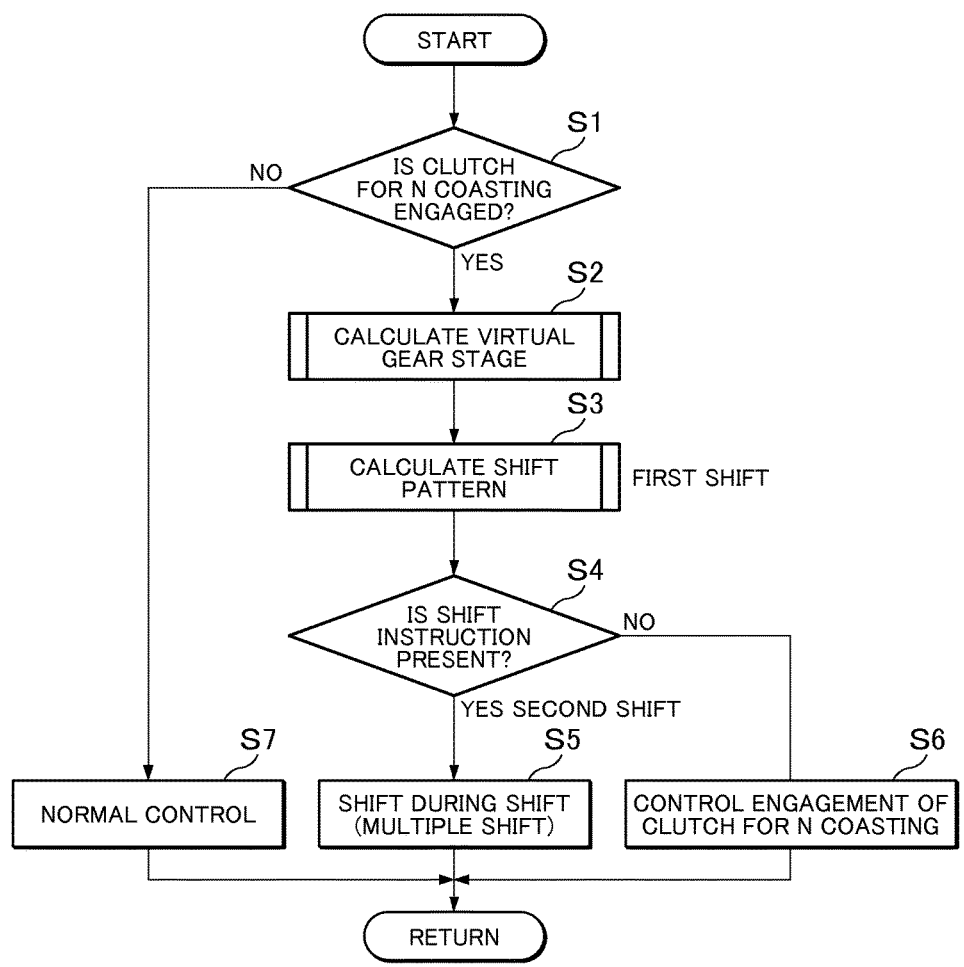
FIG. 1 is a flowchart for showing an example of the control that is executed by a shift control device according to the invention.

FIG. 1 is a flowchart for showing an example of the control. The routine that is illustrated in FIG. 1 is repeatedly executed at predetermined short time intervals during the traveling of the vehicle. As the first step of the control example that is illustrated in FIG. 1, it is determined whether or not the clutch for N coasting remains engaged (Step S1). Herein, "remaining engaged" includes the establishment of a determination for the engagement of the released clutch for the execution of the N coasting and the initiation of the engagement control. Accordingly, this determination may be replaced with a determination as to whether or not a determination regarding the return from N coasting is established.

A virtual gear stage is obtained (Step S2) in the case of a positive determination in Step S1, that is, in the case of the establishment of the determination for the engagement of the released clutch for N coasting or the execution of the engagement control. The virtual gear stage is a gear stage that is obtained based on the input rotation speed of the automatic transmission (more specifically, the turbine rotation speed Nt) at the time point of the return from N coasting. During the N coasting, any one of the clutches C1, C2 is released although the vehicle travels and the output rotation speed No becomes a predetermined rotation speed, and thus a gear stage depending on the traveling state is not determined as in the case of normal control. Meanwhile, the gear ratio at each gear stage is determined based on the configuration of the gear train and the output rotation speed No is detected by a vehicle speed sensor (not illustrated) and a rotation speed sensor (not illustrated). Accordingly, the input rotation speed of each gear stage depending on the vehicle speed during the return from N coasting can be obtained as the product of the output rotation speed No and the gear ratio of each gear stage.

Accordingly, a comparison between the turbine rotation speed Nt that is actually measured and a calculated value of the input rotation speed as the product of the vehicle speed and the gear ratio shows the input rotation speed of the gear stage corresponding to the actual measured turbine rotation speed Nt. In other words, the gear stage during the return from N coasting is obtained. The gear ratios are values set at predetermined intervals or ratios, and thus the calculated values of the input rotation speed are also values differing from each other at predetermined intervals or ratios. In contrast, the turbine rotation speed Nt is a value that continuously changes depending on the warm-up state of the engine and the operation states of the auxiliary machinery (not illustrated) such as an air-conditioning compressor. Accordingly, in many cases, the turbine rotation speed Nt corresponds to the calculated value of the input rotation speed at no gear stage. In this regard, the gear stage at which the calculated value of the input rotation speed is a value that is close to the turbine rotation speed Nt and is less than the turbine rotation speed Nt is adopted as the virtual gear stage. In other words, the gear stage at which the product of the gear ratio and the vehicle speed (or the output rotation speed of the automatic transmission) is close to the input rotation speed is adopted as the virtual gear stage among the gear stages that can be set in the automatic transmission.

Figure 2:
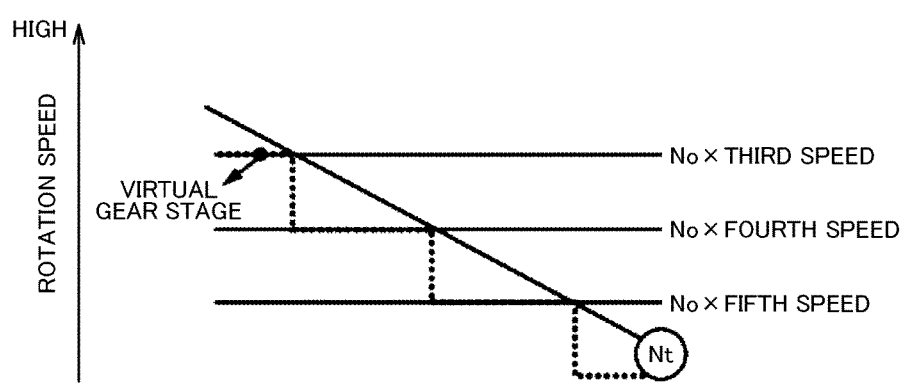
FIG. 2 is a diagram for showing how a virtual gear stage is obtained.

This relationship is schematically illustrated in FIG. 2. In FIG. 2, the oblique straight line represents the turbine rotation speed Nt and the turbine rotation speed Nt has any value on the straight line depending on the operation states of the engine. The inclination of the straight line that represents the turbine rotation speed Nt has no particular meaning. The horizontal lines in FIG. 2 represent the calculated values of the input rotation speed at the respective gear stages. The calculated values of the input rotation speed regarding third to fifth speeds are illustrated in FIG. 2, and the calculated values of the input rotation speed regarding the other shift stages can also be illustrated by similar horizontal lines. In a case where the actual measured turbine rotation speed Nt has a value between any of the horizontal lines, the gear stage that gives the turbine rotation speed Nt the calculated value of the input rotation speed illustrated by the horizontal line on the lower side in FIG. 2 is adopted as the virtual gear stage. In a case where the turbine rotation speed Nt is between the third speed and a fourth speed, for example, the third speed is adopted as the virtual gear stage. In other words, the followings are satisfied in the above-described example of the forward six-stage automatic transmission:

(i) virtual gear stage=first speed in the case of Nt>(No× first speed gear ratio)

(ii) virtual gear stage=second speed in the case of Nt> (No×second speed gear ratio)

(iii) virtual gear stage=third speed in the case of Nt>(No× third speed gear ratio)

(iv) virtual gear stage=fourth speed in the case of Nt> (No×fourth speed gear ratio)

(v) virtual gear stage=fifth speed in the case of Nt>(No× fifth speed gear ratio)

(vi) virtual gear stage=sixth speed in the case of Nt>(No× sixth speed gear ratio)

(vii) virtual gear stage=seventh speed in the case of Nt≤(No×sixth speed gear ratio)

Herein, the gear stages are "virtual gear stages" that are set during the control, and thus a "seventh stage" can be assumed during the calculation regarding the control although the setting is actually limited up to a "sixth stage" in the automatic transmission. Likewise, a "zero stage" on the lower-speed side than a "first stage" can be assumed regarding the control.

The shift control device according to the invention is configured to execute the control for the return from N coasting as the shift control in the automatic transmission. As the first step to that end, the shift control device according to the invention sets the gear stage during the N coasting as the virtual gear stage. Then, the shift control device according to the invention performs the shift control from the virtual gear stage to the current gear stage. Accordingly, a pre-shift gear stage is determined based on the obtained virtual gear stage, and a shift pattern is obtained in Step S3 based on the pre-shift gear stage and the current gear stage described above. This shift pattern is the manner of the shift control set based on the pre-shift gear stage and a post-shift gear stage. In the shift pattern, details as to the engaged or released engagement mechanism and engagement control or release control related thereto or the like are determined in advance.

Figure 3:
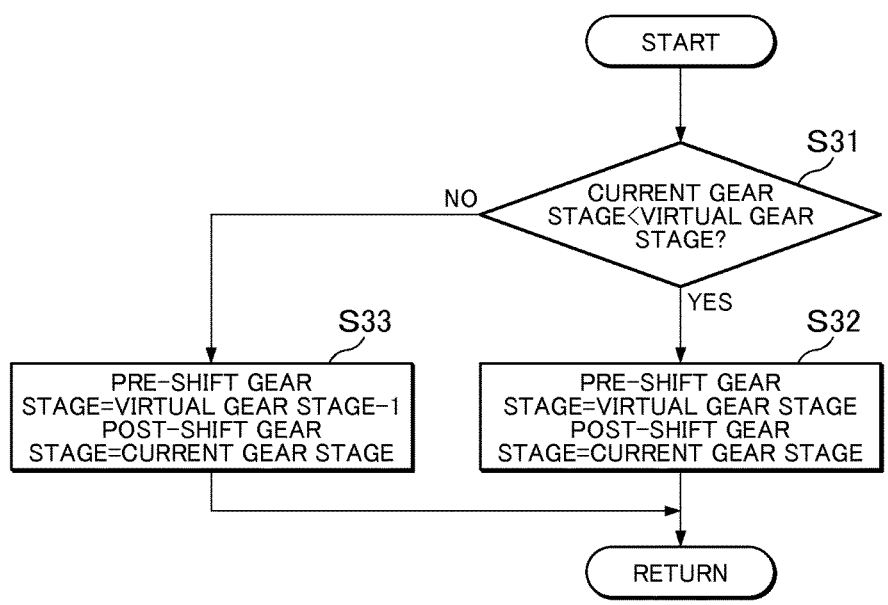
FIG. 3 is a flowchart showing a control example for the determination of a pre-shift gear stage at a first shift regarding the control according to the invention.

In a case where the shift pattern at Step S3, which is a shift pattern of a so-called first shift, is obtained, the post-shift gear stage is the current gear stage described above. The current gear stage is a gear stage that is obtained based on the vehicle speed during the N coasting, the traveling state such as the accelerator opening degree, and the shift map (shift diagram), and thus becomes various gear stages depending on the vehicle speed. Accordingly, the virtual gear stage that is obtained in the above-described manner and the current gear stage may correspond to each other in some cases. In such cases, the pre-shift gear stage and the post-shift gear stage are the same as each other, and thus the shift pattern of the so-called first shift cannot be obtained. In this regard, the shift control device according to the invention is configured to execute control for the establishment of the so-called first shift. This example is illustrated in FIG. 3. The example that is illustrated in FIG. 3 is an example in which the pre-shift gear stage of the during the so-called first shift is configured to be set to the gear stage that is on the lower-speed side by a margin of one stage.

A specific description thereof is as follows. Firstly, it is determined whether or not the virtual gear stage exceeds the current gear stage, that is, whether or not the virtual gear stage is a gear stage on the higher-speed side than the current gear stage (Step S31). In the case of a positive determination in Step S31, the virtual gear stage is adopted as the pre-shift gear stage and the current gear stage is adopted as the post-shift gear stage (Step S32), and a shift pattern for shift execution between the pre-shift gear stage and the post-shift gear stage is adopted. In the case of a negative determination in Step S31, that is, in a case where the virtual gear stage is the same as the current gear stage or is a gear stage on the lower-speed side than the current gear stage, the gear stage that is on the lower-speed side than the virtual gear stage by a margin of one stage is adopted as the pre-shift gear stage and the current gear stage is adopted as the post-shift gear stage (Step S33), and the shift pattern for shift execution between the pre-shift gear stage and the post-shift gear stage is adopted.

In the control example that is illustrated in FIG. 1, the presence or absence of a shift instruction is determined thereafter (Step S4). As described above, the determination as to the return from N coasting is established when the execution condition such as the vehicle speed being equal to or higher than a predetermined value and the accelerator being OFF is not established. Accordingly, the shift is simultaneously executed depending on the condition pertaining to the case of the return from N coasting. The N coasting execution condition is not satisfied and the return from N coasting occurs when, for example, the accelerator pedal is depressed during the N coasting and a shift determination is established and the shift instruction is output when the accelerator pedal is increasingly depressed to the point of the gear stage obtained based on the accelerator opening degree and the vehicle speed becoming the gear stage on the lower-speed side than the current gear stage. In contrast, in a case where the accelerator opening degree increases by a small amount, the return from N coasting is performed based on a brake operation, or the like, the gear stage that is obtained based on the traveling states such as the vehicle speed is the current gear stage, and thus the shift determination is not established and the shift instruction is not output.

When a positive determination is made in Step S4 based on the output of the shift instruction, that is, when a determination for the execution of a so-called second shift is established, shift during shift (or multiple shift) between the first shift based on the shift pattern obtained in Step S3 described above and the so-called second shift determined in Step S4 is executed (Step S5). The multiple shift is control for performing a plurality of shift control processes overlapping each other. During the multiple shift, for example, the other shift (second shift) is initiated before the completion of one shift control (that is, during the first shift) and the plurality of shift control processes are performed for the execution periods of the two shift control processes overlap each other at least in part.

Figure 4:
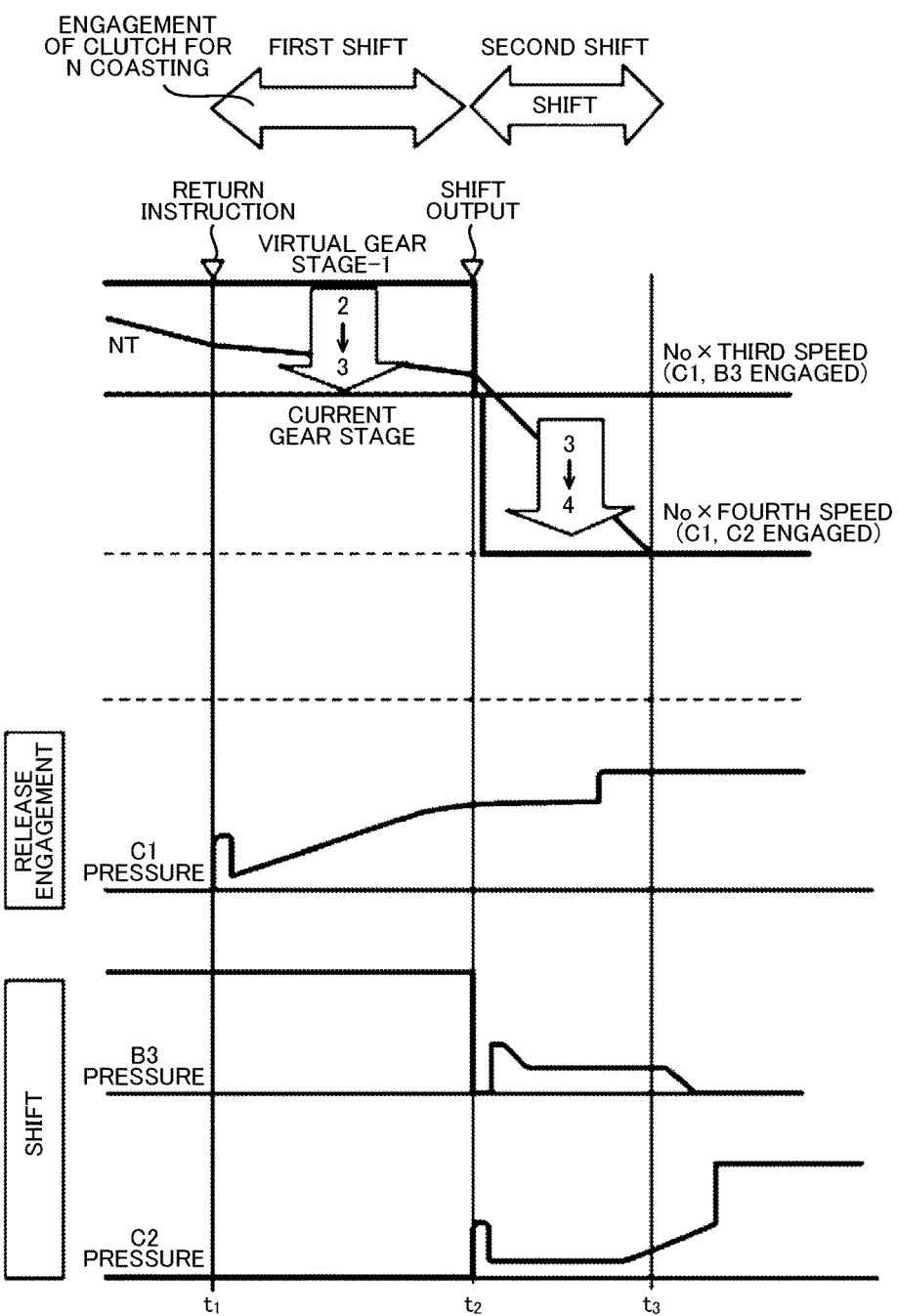
FIG. 4 is a time chart for showing an example of upshift during upshift as multiple shift according to the invention.

An example of the multiple shift is as follows. FIG. 4 illustrates an example pertaining to a case where the virtual gear stage and the current gear stage are the third speed and the shift instruction toward the fourth speed is present, that is, an example of upshift during upshift. A return instruction is output (t1 time point) since the N coasting execution condition is not satisfied, that is, a return condition is satisfied. At this time point, the third speed is the current gear stage, and thus the third brake B3 is engaged and the first clutch C1, which is the clutch for N coasting, is released. The second clutch C2 is released at the third speed. In addition, the engine has a high idling rotation speed due to, for example, the generation of an auxiliary machinery load or the engine has a high opening degree ring rotation speed as, for example, the accelerator pedal returns immediately after a kick-down operation for significantly depressing the accelerator pedal, and thus the turbine rotation speed Nt is a rotation speed that exceeds the calculated value of the input rotation speed at the third speed as the current gear stage. The return instruction is performed in this state. When the virtual gear stage and the current gear stage are the same as each other as described above in this case, the pre-shift gear stage at the first shift for the return from N coasting becomes the gear stage that is on the lower-speed side than the virtual gear stage by a margin of one stage (virtual gear stage-1) and the second speed becomes the pre-shift gear stage. Accordingly, the shift pattern that is executed based on the return instruction is upshift from the second speed to the third speed. In other words, the third brake B3 is already engaged, and thus control for the engagement of the first clutch C1 is initiated first. Regarding this engagement control, control for an increase in hydraulic pressure at a predetermined gradient is executed to follow fast fill because a hydraulic multi-plate clutch constitutes the first clutch C1. The fast fill is control for temporarily increasing the hydraulic pressure so that a gap (pack) in the first clutch C1 is packed for a rise in torque capacity in response to a rise in hydraulic pressure. The increase gradient of the hydraulic pressure after the fast fill is determined in advance in view of design considerations so that no shift shock or engagement shock occurs or no excessive slip occurs.

When the turbine rotation speed Nt as the input rotation speed of the automatic transmission becomes close to the rotation speed at the post-shift gear stage of the first shift (pre-shift gear stage of the second shift) described above during the course of an increase in the hydraulic pressure (C1 pressure) of the first clutch C1 (t2 time point), second shift control is initiated even during the control of the hydraulic pressure of the first clutch C1 (that is, shift). The second shift according to the example described herein is upshift from the third speed to the fourth speed and the fourth speed is set based on the engagement of the first clutch C1 and the second clutch C2 and the release of each brake. Accordingly, control for reducing the hydraulic pressure of the third brake B3 (B3 pressure) is initiated and control for the engagement of the second clutch C2 is initiated at t2 time point. The release control for the third brake B3 is control in which a hydraulic pressure command value is temporarily reduced to zero, a low pressure is maintained immediately thereafter, and then the pressure is ultimately reduced to zero. As with the fast fill described above, the engagement control for the second clutch C2 is control in which a command value is temporarily increased, a low pressure is maintained, the command value is increased at a predetermined gradient, and then the pressure is ultimately increased to a maximum pressure such as a line pressure.

While the control for the upshift toward the fourth speed is performed as described above, the turbine rotation speed Nt is reduced toward the rotation speed at the fourth speed beyond the rotation speed at the third speed. In addition, the hydraulic pressure of the first clutch C1 is maintained at a predetermined pressure because of the incompletion of the engagement control, and then is increased to the maximum pressure such as the line pressure when the period in which the hydraulic pressure is maintained is over. In other words, control for shift to the third speed is terminated at a time point during the execution of the second shift toward the fourth speed. In other words, the control regarding the second shift toward the fourth speed is initiated before the termination of the shift control from the virtual gear stage to the current gear stage and the first shift and the second shift proceed at the same time. Then, the turbine rotation speed Nt reaches the rotation speed at the fourth speed (rotation speed represented as the product of the output rotation speed No and the gear ratio at the fourth speed) at t3 time point, when the torque capacity of the second clutch C2 is increased to some extent and the third brake B3 is sufficiently released. Then, the shift is substantially terminated. The hydraulic pressure of the third brake B3 is reduced to zero thereafter for a complete release. In addition, the hydraulic pressure of the second clutch C2 (C2 pressure) is increased to the maximum pressure such as the line pressure after a complete engagement. Then, the second shift is terminated.

Figure 5:
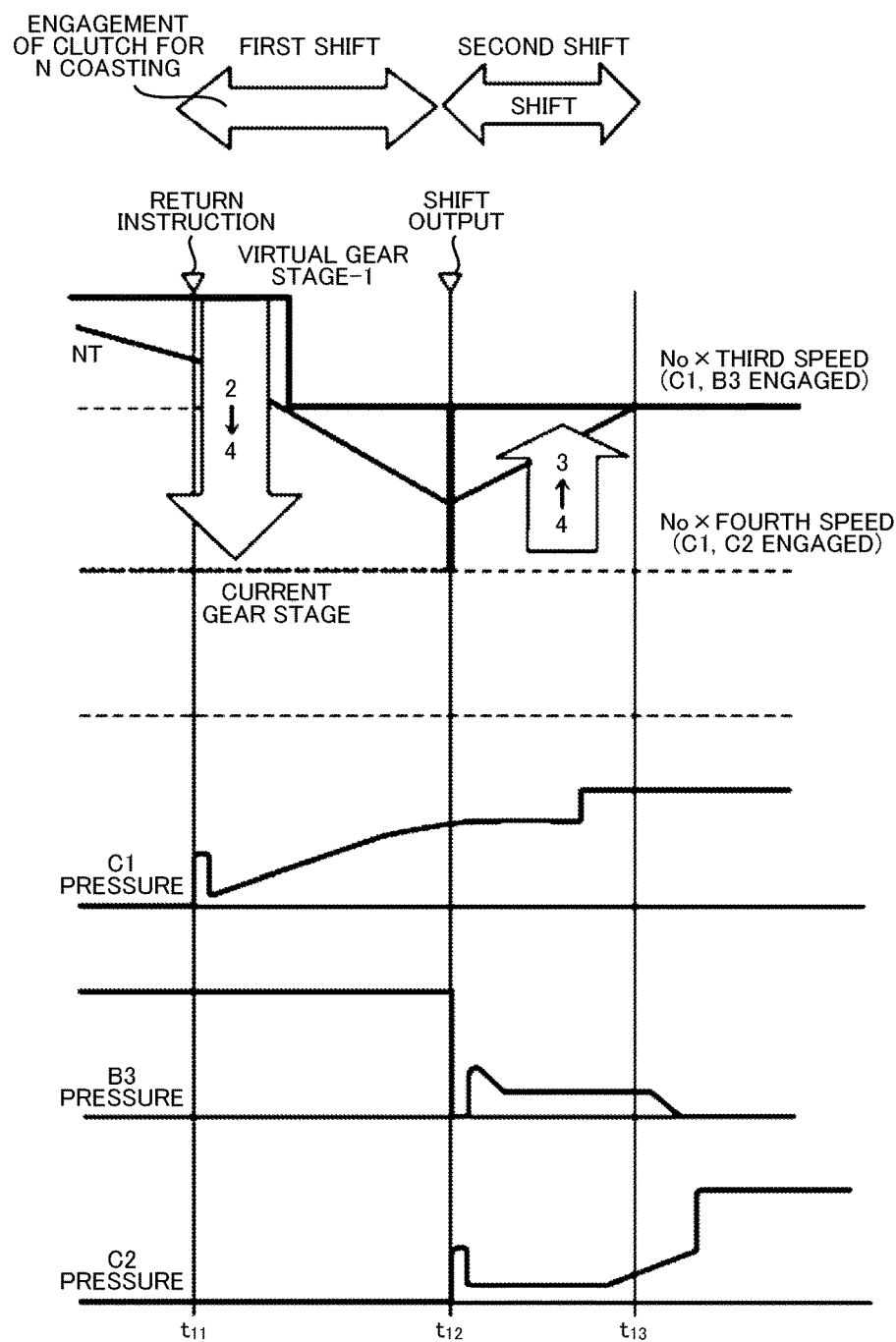
FIG. 5 is a time chart for showing an example of downshift during upshift as the multiple shift according to the invention.

FIG. 5 illustrates an example pertaining to a case where the virtual gear stage is the third speed, the current gear stage is the fourth speed, and a shift instruction toward the third speed is present, that is, downshift as the second shift is initiated during upshift as the first shift. Since the virtual gear stage is a gear stage that is on the higher-speed side than the current gear stage in this case, the pre-shift gear stage regarding the first shift is the gear stage that is on the lower-speed side than the virtual gear stage by a margin of one stage, that is, the second speed as described above with reference to FIG. 3. Even in the example that is illustrated in FIG. 5, the return instruction is output (t11 time point) because the N coasting execution condition is not satisfied, that is, the return condition is satisfied. At this time point, the fourth speed is the current gear stage, and thus the first clutch C1 as the clutch for N coasting is released, although the second clutch C2 is engaged, and each brake is released. When the return instruction is output in this state, control of the first shift is initiated first. The first shift pertaining to this case is shift control in which the second speed, which is on the lower-speed side than the virtual gear stage by a margin of one stage, is the pre-shift gear stage and the fourth speed as the current gear stage is the post-shift gear stage. Since the fourth speed is set based on the engagement of the first and second clutches C1, C2 as described above and each brake is released at t11 time point, engagement control for the first clutch C1 released during the N coasting control is initiated. This control is similar to the control according to the example illustrated in FIG. 4.

The turbine rotation speed Nt is reduced toward the rotation speed at the fourth speed beyond the rotation speed at the virtual gear stage as a result of a gradual increase in the torque capacity of the first clutch C1. The pre-shift gear stage is switched to the virtual gear stage once the turbine rotation speed Nt is reduced to the rotation speed at the third speed as the virtual gear stage. When the hydraulic pressure of the first clutch C1 reaches a hydraulic pressure that is sufficient to almost completely engage the first clutch C1 thereafter, shift from the fourth speed obtained as the current gear stage toward the third speed as a target gear stage obtained based on the traveling states such as the vehicle speed and the accelerator opening degree, that is, a second shift is initiated (t12 time point). This second shift is so-called clutch-to-clutch shift in which the second clutch C2 is released and the third brake B3 is engaged. At this time point, the first clutch C1 has an increased hydraulic pressure but the control thereof is not terminated, and thus the turbine rotation speed Nt does not reach the rotation speed at the fourth speed as the post-shift gear stage of the first shift. In other words, even in the example that is illustrated in FIG. 5, the control of the second shift for the setting of a target gear stage is initiated during the course of the control of the first shift for the return from N coasting. Control of the hydraulic pressure for the release of the second clutch C2 may be performed similarly to the control during the release of the third brake B3 described with regard to the above-described control example illustrated in FIG. 4. Control of the hydraulic pressure for the engagement of the third brake B3 may be performed similarly to the control during the engagement of the second clutch C2 described with regard to the above-described control example illustrated in FIG. 4. Then, the turbine rotation speed Nt reaches the rotation speed at the third speed (rotation speed represented as the product of the output rotation speed No and the gear ratio at the third speed) at t13 time point, when the torque capacity of the third brake B3 is increased to some extent and the second clutch C2 is sufficiently released. Then, the shift is substantially terminated. The hydraulic pressure of the second clutch C2 is reduced to zero thereafter for a complete release. In addition, the hydraulic pressure of the third brake B3 is increased to the maximum pressure such as the line pressure after a complete engagement. Then, the second shift is terminated.

Figure 6:
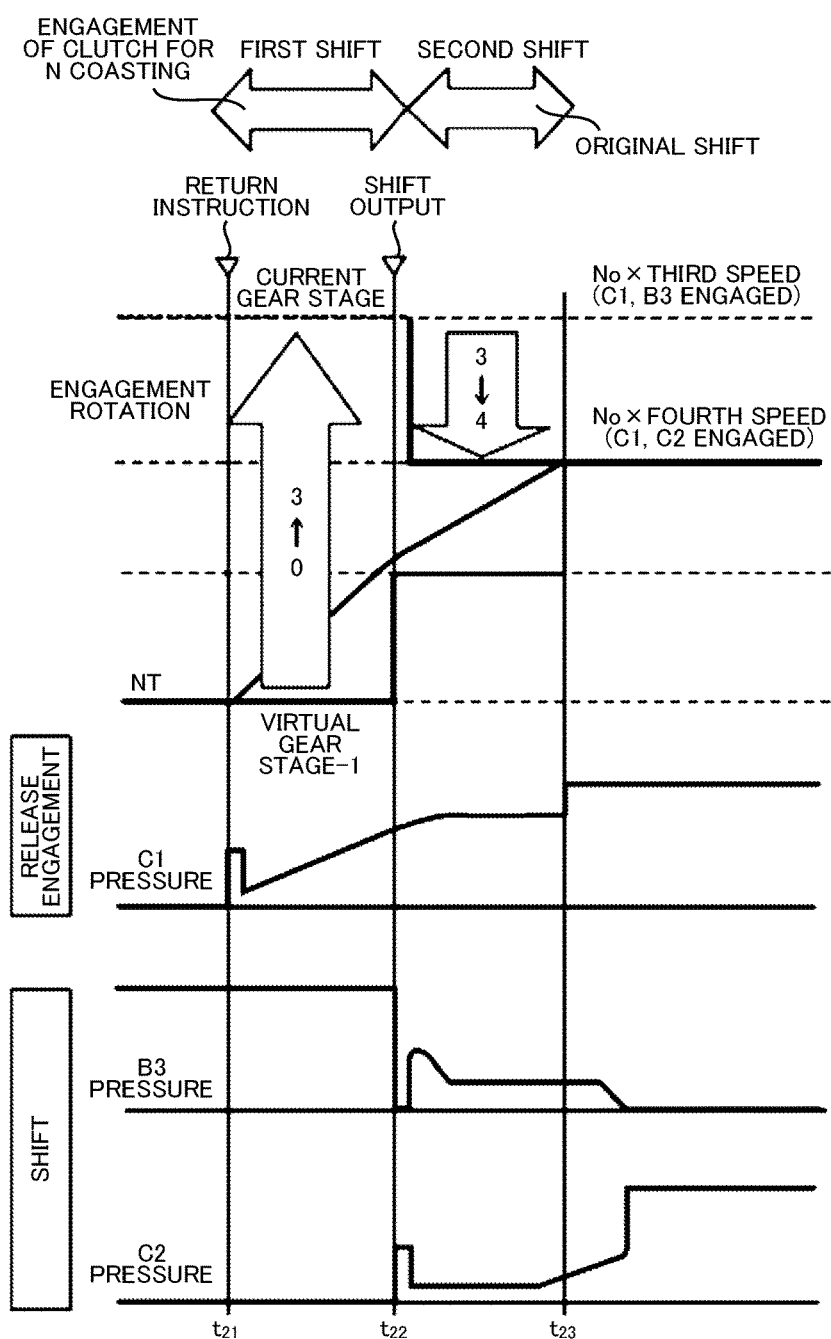
FIG. 6 is a time chart for showing an example of upshift during downshift as the multiple shift according to the invention.

The example that is illustrated in FIG. 6 is an example in which upshift as the second shift is initiated during downshift as the first shift. In this control example, the turbine rotation speed Nt during the N coasting is close to the idle rotation speed of the engine, and thus the virtual gear stage is the sixth speed. In addition, the current gear stage is the third speed due to a reduction in the vehicle speed or the like, and thus the third brake B3 is engaged and the first clutch C1 as the clutch for N coasting is released. Furthermore, the target gear stage that is determined based on the accelerator opening degree causing the return from N coasting is the fourth speed. When the return instruction is performed (t21 time point) based on an increase in the accelerator opening degree or the like in this state, downshift control from the sixth speed as the virtual gear stage toward the third speed as the current gear stage is initiated. Specifically, control for the engagement of the first clutch C1 as the clutch for N coasting is initiated. Control of the hydraulic pressure of the first clutch C1 pertaining to this case is similar to the control according to each of the above-described control examples illustrated in FIGS. 4 and 5.

When the torque capacity of the first clutch C1 gradually increases, the turbine rotation speed Nt gradually increases toward the rotation speed at the third speed. Then, shift output of upshift (second shift) from the third speed as the current gear stage toward the fourth speed as the target gear stage is performed once the hydraulic pressure of the first clutch C1 increases to become close to the hydraulic pressure at which the first clutch C1 can be almost completely engaged and the turbine rotation speed Nt increases to become close to the rotation speed at the fifth speed (t22 time point). Since the fourth speed is set based on the engagement of the first and second clutches C1, C2, the engaged third brake B3 is released and control for the engagement of the second clutch C2 is initiated. These control processes are similar to the control according to the above-described control example that is illustrated in FIG. 4.

While the control for the upshift toward the fourth speed is performed as described above, the turbine rotation speed Nt increases toward the rotation speed at the fourth speed. In addition, the hydraulic pressure of the first clutch C1 is maintained at a predetermined pressure because of the incompletion of the engagement control, and then is increased to the maximum pressure such as the line pressure when the period in which the hydraulic pressure is maintained is over. In other words, control for shift to the third speed is terminated at a time point during the execution of the second shift toward the fourth speed. In other words, the control regarding the second shift toward the fourth speed is initiated before the termination of the shift control from the virtual gear stage to the current gear stage and the first shift and the second shift proceed at the same time. Then, the turbine rotation speed Nt reaches the rotation speed at the fourth speed (rotation speed represented as the product of the output rotation speed No and the gear ratio at the fourth speed) at t23 time point, when the torque capacity of the second clutch C2 is increased to some extent and the third brake B3 is sufficiently released. Then, the shift is substantially terminated. The hydraulic pressure of the third brake B3 is reduced to zero thereafter for a complete release. In addition, the hydraulic pressure of the second clutch C2 is increased to the maximum pressure such as the line pressure after a complete engagement. Then, the second shift is terminated.

Figure 7:
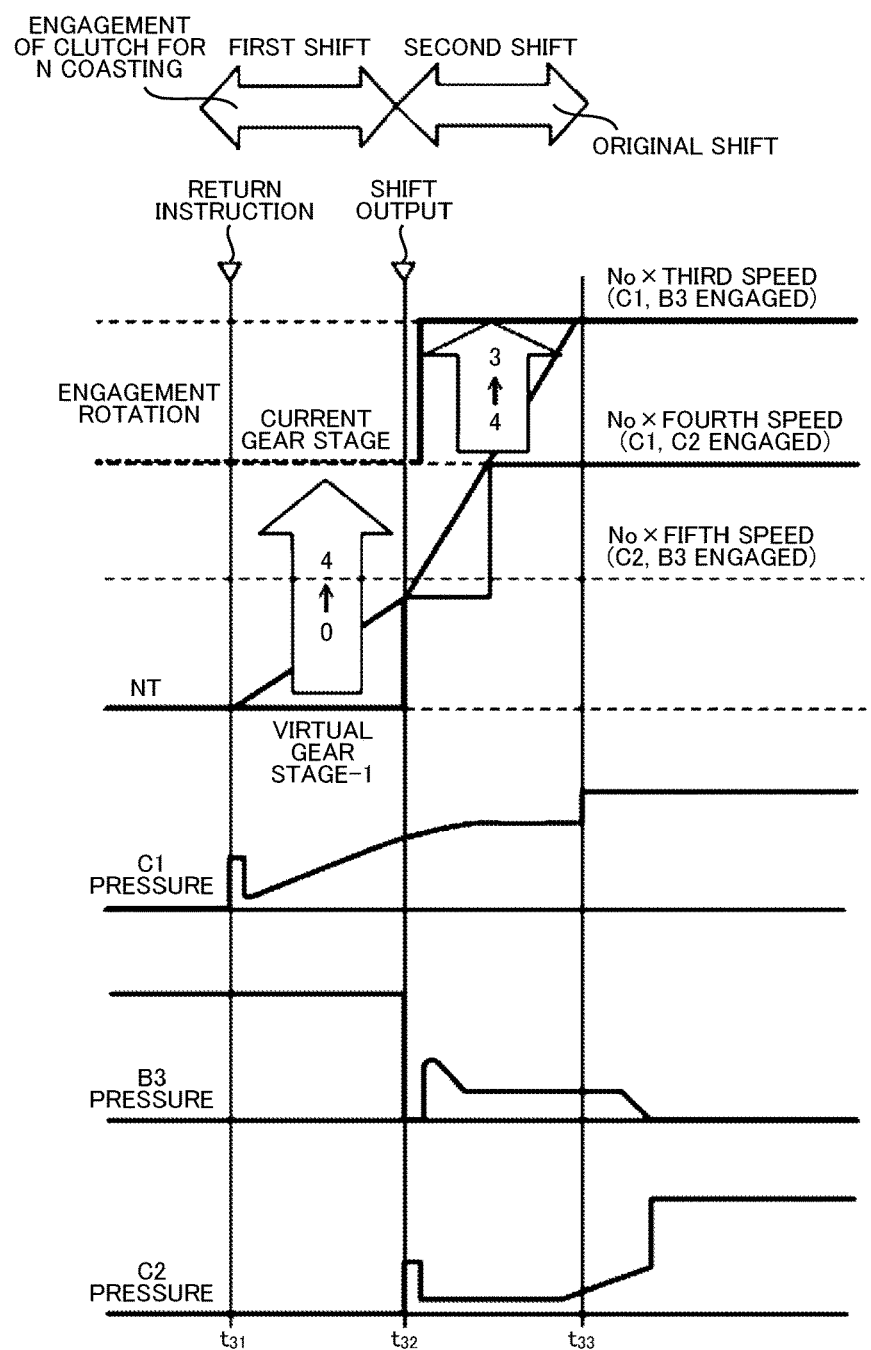
FIG. 7 is a time chart for showing an example of downshift during downshift as the multiple shift according to the invention.

The example that is illustrated in FIG. 7 is an example in which downshift as the second shift is initiated during downshift as the first shift. In this control example, the turbine rotation speed Nt during the N coasting is close to the idle rotation speed of the engine, and thus the virtual gear stage is the sixth speed. In addition, the current gear stage is the fourth speed because a certain degree of the vehicle speed is maintained or the like, and thus the second clutch C2 is engaged and the first clutch C1 as the clutch for N coasting is released. Furthermore, the target gear stage that is determined based on the accelerator opening degree causing the return from N coasting is the third speed. When the return instruction is performed (t31 time point) based on an increase in the accelerator opening degree or the like in this state, downshift control from the sixth speed as the virtual gear stage toward the fourth speed as the current gear stage is initiated. Specifically, control for the engagement of the first clutch C1 as the clutch for N coasting is initiated. Control of the hydraulic pressure of the first clutch C1 pertaining to this case is similar to the control according to each of the above-described control examples illustrated in FIGS. 4 to 6.

When the torque capacity of the first clutch C1 gradually increases, the turbine rotation speed Nt gradually increases toward the rotation speed at the third speed. Then, shift output of downshift (second shift) from the fourth speed as the current gear stage toward the third speed as the target gear stage is performed once the hydraulic pressure of the first clutch C1 increases to become close to the hydraulic pressure at which the first clutch C1 can be almost completely engaged and the turbine rotation speed Nt increases to become close to the rotation speed at the fifth speed (t32 time point). Since the third speed is set based on the engagement of the first clutch C1 and the third brake B3, the engaged second clutch C2 is released and control for the engagement of the third brake B3 is initiated. These control processes are similar to the control according to the above-described control example that is illustrated in FIG. 5.

While the control for the downshift toward the third speed is performed as described above, the turbine rotation speed Nt increases toward the rotation speed at the third speed. In addition, the hydraulic pressure of the first clutch C1 is maintained at a predetermined pressure because of the incompletion of the engagement control, and then is increased to the maximum pressure such as the line pressure when the period in which the hydraulic pressure is maintained is over. In other words, control for shift to the fourth speed is terminated at a time point during the execution of the second shift toward the third speed. In other words, the control regarding the second shift toward the third speed is initiated before the termination of the shift control from the virtual gear stage to the current gear stage and the first shift and the second shift proceed at the same time. Then, the turbine rotation speed Nt reaches the rotation speed at the third speed (rotation speed represented as the product of the output rotation speed No and the gear ratio at the third speed) at t33 time point, when the torque capacity of the third brake B3 is increased to some extent and the second clutch C2 is sufficiently released. Then, the shift is substantially terminated. The hydraulic pressure of the second clutch C2 is reduced to zero thereafter for a complete release. In addition, the hydraulic pressure of the third brake B3 is increased to the maximum pressure such as the line pressure after a complete engagement. Then, the second shift is terminated.

The multiple shift that is executed in Step S5 in FIG. 1 is as described above. In the case of a negative determination in Step S4 in FIG. 1, in contrast, control for the engagement of the clutch for N coasting is executed as the control for the return from N coasting (Step S6). This engagement control is not control for shift but control for engagement based on simple hydraulic pressure supply to the clutch for N coasting.

In the case of a negative determination in Step S1, that is, in a case where the N coasting is not performed or no return determination is established while the N coasting is performed in Step S1, normal control is executed (Step S7) and the processing returns thereafter. In a case where the N coasting is not performed, this normal control is control for the setting of a predetermined gear stage based on the traveling states such as the vehicle speed and the accelerator opening degree. While the N coasting is performed, this normal control is control for engaging the brake so that the gear stage based on the traveling state at that time point is set in a state where the clutch for N coasting is released.

As described above with reference to FIGS. 4 to 7, the shift control device according to the invention executes the return from N coasting as the shift control by setting the virtual gear stage. In a case where the return from N coasting overlaps the shift, the shift control device according to the invention allows the two shift control processes, that is, the first shift for the return and the second shift for the setting of the target gear stage to proceed at the same time. Accordingly, the second shift for the setting of the target gear stage can be initiated early even before the termination of the first shift. As a result, shift response is improved.

Figure 8:
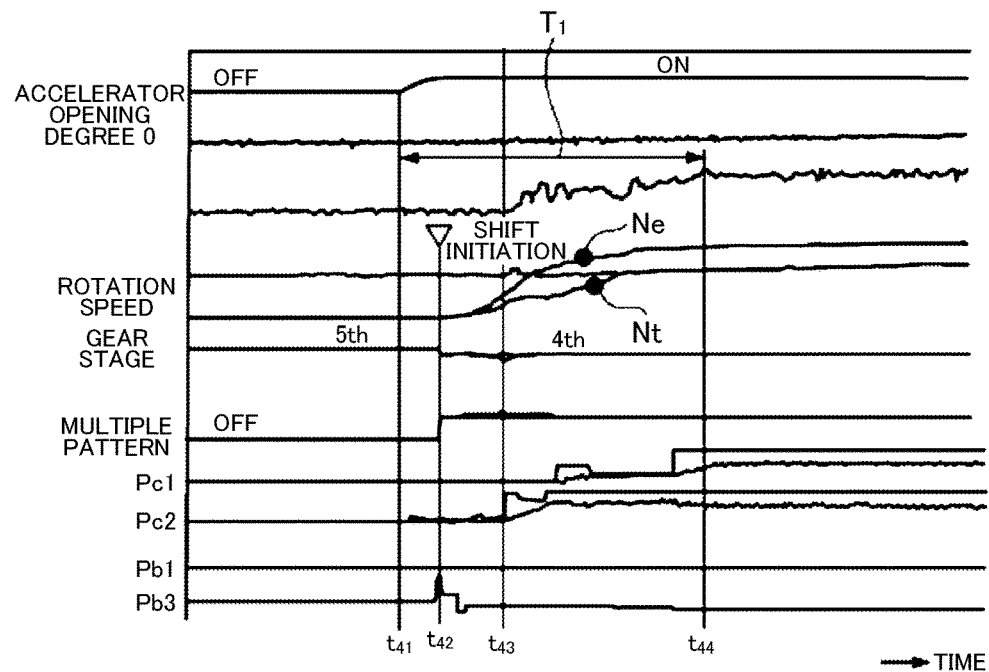
FIG. 8 is a time chart for showing an effect of the invention, FIG. 8(a) being a time chart pertaining to a case where the control according to the invention is performed and FIG. 8(b) being a time chart pertaining to a case where control according to the related art is performed.
Figure 8:
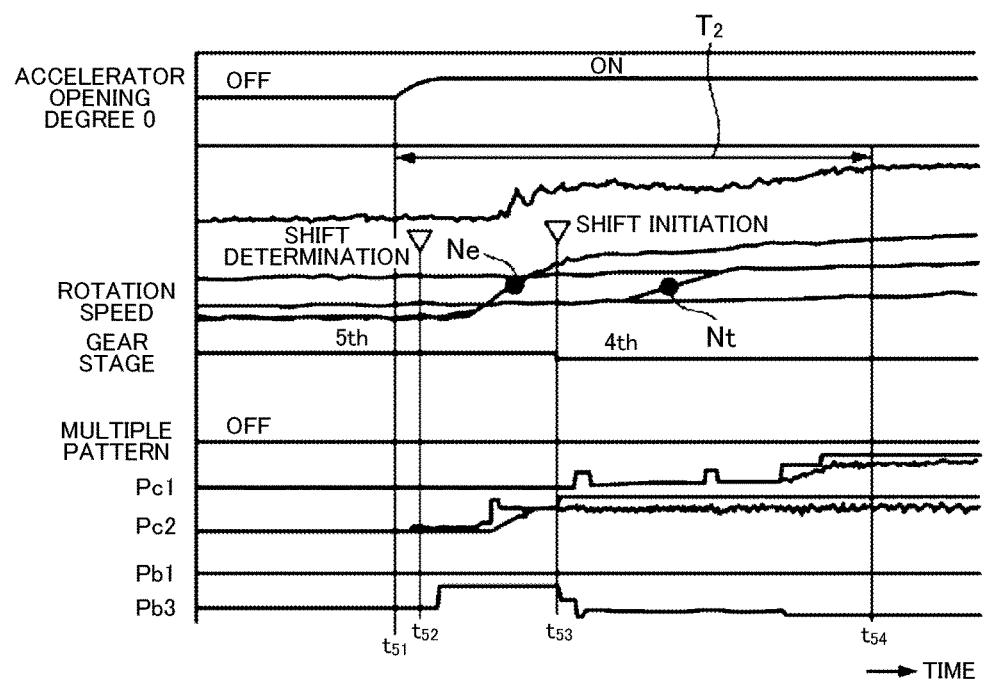

A more detailed description of the shift response improvement effect that can be achieved by the invention is as follows. FIG. 8 is a diagram illustrating how the engine rotation speed Ne, the turbine rotation speed Nt, and the hydraulic pressure of each engagement mechanism change in a case where downshift is performed as a result of the return from N coasting. FIG. 8(a) shows an example pertaining to a case where the control according to the invention is performed while FIG. 8(b) shows an example pertaining to a case where control based on a device according to the related art is performed. In these examples, the accelerator pedal is depressed while the N coasting is performed at a current gear stage of the fifth speed, the virtual gear stage is set to the sixth speed, and the target gear stage determined based on the accelerator opening degree and the vehicle speed is the fourth speed. When the accelerator pedal is depressed and the determination for the return from N coasting is established in FIG. 8(a) (t41 time point), the virtual gear stage is set to the sixth speed and the target shift stage is set to the fourth speed. Accordingly, the current gear stage is the fifth speed, and thus shift for a return in which the sixth speed as the virtual gear stage is the pre-shift gear stage and the fifth speed is the post-shift gear stage is executed.

Although the fifth speed is set based on the engagement of the second clutch C2 and the third brake B3 as illustrated in the above-described chart in FIG. 10, the second clutch C2 is released as the clutch for N coasting in this case, and thus control for the supply of hydraulic pressure Pc2 to the second clutch C2 and the engagement thereof is initiated. In addition, since the third brake B3 is released in the sixth speed as the virtual gear stage, the hydraulic pressure command value of the third brake B3 temporarily increases (t42 time point) as a result of the execution of the first shift from the virtual gear stage toward the fifth speed. Almost simultaneously, the so-called second shift toward the target gear stage is initiated and the hydraulic pressure command value of the third brake B3 is gradually reduced thereafter. The torque capacity of the second clutch C2 gradually increases and the hydraulic pressure Pb3 of the third brake B3 is reduced and the torque capacity thereof is gradually reduced in response thereto, and thus the engine rotation speed Ne and the turbine rotation speed Nt gradually increase.

Once the turbine rotation speed Nt reaches the rotation speed at the fifth speed (t43 time point), upshift toward the fifth speed as the first shift is completed, and thus the hydraulic pressure command value of the second clutch C2 is increased so that the second clutch C2 is completely engaged. Since the second clutch C2 is engaged and the torque capacity of the third brake B3 is reduced, the engine rotation speed Ne and the turbine rotation speed Nt continue to increase and control for the engagement of the first clutch C1 is initiated in that state. A change in the hydraulic pressure command value of the hydraulic pressure Pc1 of the first clutch C1 is as described above, and the torque capacity maintained at a predetermined hydraulic pressure is increased at a predetermined gradient after the fast fill. During the course, the turbine rotation speed Nt reaches the rotation speed at the fourth speed as the target gear stage. Then, the hydraulic pressure command value of the first clutch C1 is increased to a value for the supply of the maximum pressure such as the line pressure. As a result, the torque capacity of the first clutch C1 further increases and an engagement state where the input torque at that time point can be transmitted without slip generation is achieved. In other words, the fourth speed as the target gear stage is achieved and the shift is terminated (t44 time point). Since the first brake B1 is not involved in the shift, the hydraulic pressure Pb1 of the first brake B1 is set to a low pressure and the first brake B1 is maintained in a released state.

Meanwhile, the achievement of the target gear stage is significantly delayed in the control example according to the related art that is illustrated in FIG. 8(b). In other words, the first shift for the return is initiated at t52 time point, which is immediately after the accelerator pedal is depressed and the determination for the return from N coasting is established (t51 time point). This first shift is shift from the sixth speed as the virtual gear stage toward the fifth speed as the current gear stage as described above, and thus control for an increase in the hydraulic pressure Pb3 of the third brake B3 and control for the engagement of the second clutch C2, which is released during the N coasting, are performed. Although the turbine rotation speed Nt reaches the rotation speed at the fifth speed during the course of the execution of the control, the downshift control from the sixth speed as the virtual gear stage toward the fifth speed is executed similarly to control during normal shift other than the control for the return from N coasting and is executed in accordance with a pattern determined in advance. In other words, the hydraulic pressure command value, the duration thereof, and the like are determined in advance and the shift is terminated after the elapse of the control time. Accordingly, in the control example according to the related art that is illustrated in FIG. 8(b), the second shift toward the target gear stage is initiated when the control of the first shift described above is terminated after the turbine rotation speed Nt reaches the rotation speed at the fifth speed. "t53" in FIG. 8(b) refers to this time point, at which control for releasing the third brake B3 by reducing the hydraulic pressure Pb3 of the third brake B3 is initiated and control for engaging the first clutch C1 by increasing the hydraulic pressure Pc1 of the first clutch C1 is initiated. The control processes are also executed for the command value and the actual hydraulic pressure to change in conformity with a pattern determined in advance, and thus the second shift is terminated (t54 time point) when the first clutch C1 is completely engaged after the hydraulic pressure command value of the first clutch C1 is increased to a value for commanding the maximum pressure such as the line pressure. Since the first brake B1 is not involved in the shift, the hydraulic pressure Pb1 of the first brake B1 is set to a low pressure and the first brake B1 is maintained in a released state.

According to the above-described control examples of the invention, the return control and the shift control are controlled to proceed at the same time in a case where the return from N coasting and shift based on an acceleration/deceleration request are performed as illustrated in FIG. 8(a). Accordingly, the time taken from the time point at which the operation for the return from N coasting is performed to achieve the target gear stage becomes the short time that is illustrated by "T1" in FIG. 8(a). In the control according to the related art, in contrast, the shift control toward the target gear stage is initiated after the completion of the control for the return from N coasting, and thus the time taken from the time point at which the operation for the return from N coasting is performed to achieve the target gear stage becomes the long time that is illustrated by "T2" in FIG. 8(b). In other words, the shift control device according to the invention improves the shift response of the shift entailing the return from N coasting by shortening the period of time that is required for the shift.

The invention is not limited to the specific examples described above and the automatic transmission as the object of the invention may also be a stepped transmission which is provided with a gear train other than the gear train illustrated in FIG. 9. In addition, any appropriate method can be adopted if necessary as a method for determining the virtual gear stage for the return from N coasting and a gear stage at which the calculated value of the input rotation speed exceeds the turbine rotation speed Nt can also be adopted as the virtual gear stage. In summary, any configuration in which the shift determination for the return from N coasting is established is acceptable. In addition, the shift control device according to the invention may be configured to allow the shift control for the return from N coasting and the shift control toward the target gear stage determined based on the operation causing the return to proceed at the same time, and thus the shift control device according to the invention may be configured for the respective shifts to be initiated at the same time or for the control of both to proceed at the same time during the course of the control despite the control processes are initiated at different moments.

REFERENCE SIGNS LIST

1 . . . torque converter, 4 . . . input shaft, 5 . . . single pinion-type planetary gear mechanism, 6 . . . Ravigneaux-type planetary gear mechanism, B1 . . . first brake, B3 . . . third brake, 7 . . . output gear, C1 . . . first clutch, C2 . . . second clutch, B2 . . . second brake, F1 . . . one-way clutch, ECU . . . shift control device

What is claimed is:

1. A shift control device for a vehicle, the vehicle including an automatic transmission, the shift control device comprising:
an electronic control unit configured to:
 i) set a target gear stage based on data showing traveling states, including at least a driving demand;
 ii) set a neutral state, where power is not transmitted, by releasing an engagement mechanism engaged such that a predetermined gear stage is set in the automatic transmission, when a predetermined condition is satisfied during traveling, such that coasting is allowed;
 iii) eliminate the neutral state, when the predetermined condition is not satisfied during the coasting in the neutral state, by engaging the engagement mechanism;
 iv) calculate a virtual gear stage, when the predetermined condition is not satisfied during the coasting in the neutral state, such that the virtual gear stage is set as a gear stage of the automatic transmission at which a rotation speed is closest to an input rotation speed, the virtual gear stage being calculated based on a vehicle speed at a time point when the virtual gear stage is calculated and a gear ratio at a gear stage allowed to be set in the automatic transmission;
 v) control a first shift of the automatic transmission, when the neutral state is eliminated, such that a first shift change between a current gear stage during the neutral state and the virtual gear stage is initiated, and a second shift change toward the target gear stage is initiated during the first shift; and
 vi) supply hydraulic pressure for forming the target gear stage to the engagement mechanism before the first shift is completed.

2. The shift control device according to claim 1, wherein the electronic control unit is configured to calculate the virtual gear stage such that the virtual gear stage is a gear stage at which a product of a gear ratio and an output rotation speed of the automatic transmission is closest to the input rotation speed in the neutral state at a time point when the virtual gear stage is calculated, and at which the product is less than the input rotation speed.

3. The shift control device according to claim 1, wherein the electronic control unit is further configured to perform a pre-shift gear stage in a case where the virtual gear stage is a gear stage corresponding to the current gear stage or a gear stage on a higher-speed side than the current gear stage.

4. The shift control device according to claim 3, wherein the pre-shift gear stage includes a gear stage on a lower-speed side than the virtual gear stage by a margin of one stage.

5. A shift control device for a vehicle, the vehicle including an automatic transmission, the shift control device comprising:
an electronic control unit configured to:
 i) set a target gear stage based on data showing traveling states, including at least a driving demand;
 ii) set a neutral state, where power is not transmitted, by releasing an engagement mechanism engaged such that a predetermined gear stage is set in the automatic transmission, when a predetermined condition is satisfied during traveling, such that coasting is allowed;
 iii) eliminate the neutral state, when the predetermined condition is not satisfied during the coasting in the neutral state, by engaging the engagement mechanism;
 iv) calculate a virtual gear stage, when the predetermined condition is not satisfied during the coasting in the neutral state, such that the virtual gear stage is set as a gear stage of the automatic transmission at which a rotation speed is closest to an input rotation speed, the virtual gear stage being calculated based on a vehicle speed at a time point when the virtual gear stage is calculated and a gear ratio at a gear stage allowed to be set in the automatic transmission;
 v) control a first shift of the automatic transmission, when the neutral state is eliminated, such that a first shift change between a current gear stage during the neutral state and the virtual gear stage is initiated, and a second shift change toward the target gear stage is initiated during the first shift;
 vi) control a second shift, that is initiated during the first shift, before reaching a torque capacity of the virtual gear stage; and
 vii) reduce a hydraulic pressure necessary for forming the virtual gear stage, that is unnecessary for forming the target gear stage, and that is supplied to the engagement mechanism.

6. The shift control device according to claim 5, wherein the electronic control unit is configured to calculate the virtual gear stage such that the virtual gear stage is a gear stage at which a product of a gear ratio and an output rotation speed of the automatic transmission is closest to the input rotation speed in the neutral state at a time point when the virtual gear stage is calculated, and at which the product is less than the input rotation speed.

7. The shift control device according to claim 5, wherein the electronic control unit is further configured to perform a pre-shift gear stage in a case where the virtual gear stage is a gear stage corresponding to the current gear stage or a gear stage on a higher-speed side than the current gear stage.

8. The shift control device according to claim 7, wherein the pre-shift gear stage includes a gear stage on a lower-speed side than the virtual gear stage by a margin of one stage.

\* \* \* \* \*